United States Patent [19]

Hara

[11] Patent Number: 4,488,411
[45] Date of Patent: Dec. 18, 1984

[54] IDLE SPEED CONTROL APPARATUS

[75] Inventor: Kiyoshi Hara, Oobu, Japan

[73] Assignee: Nippondenso Co., Ltd., Kariya, Japan

[21] Appl. No.: 504,427

[22] Filed: Jun. 15, 1983

[30] Foreign Application Priority Data

Jun. 16, 1982 [JP] Japan .................. 57-104183

[51] Int. Cl.³ .................. B60H 3/04; F25B 27/00
[52] U.S. Cl. .................. 62/133; 62/228.4;
62/228.5; 62/243; 62/323.1; 123/339
[58] Field of Search .................. 62/133, 215, 323.1,
62/228.1, 228.4, 228.5, 230, 243, 196.2, 196.1;
123/339, 340; 165/43; 364/431.07, 431.1

[56] References Cited

U.S. PATENT DOCUMENTS

| 3,010,289 | 11/1961 | Kuklinski | 62/215 X |
| 4,289,100 | 9/1981 | Kinugawa et al. | 62/323.1 X |
| 4,312,311 | 1/1981 | Iwata | 62/243 |
| 4,344,399 | 8/1982 | Matsumura et al. | 364/431.07 |
| 4,376,427 | 3/1983 | Mizuno | 123/339 |

Primary Examiner—Harry Tanner
Attorney, Agent, or Firm—Cushman, Darby & Cushman

[57] ABSTRACT

The idle speed of an internal combustion engine is automatically adjusted in cooperation with the variable adjustment of the operating condition of a refrigerant compressor of an automobile air conditioner.

3 Claims, 3 Drawing Figures

IDLE SPEED CONTROL APPARATUS

BACKGROUND OF THE INVENTION

The present invention relates to an idle speed control apparatus for controlling the idle speed of an internal combustion engine used as a prime mover for driving an automobile. More particularly, the invention relates to an idle speed control apparatus for automatically adjusting the idle speed of an internal combustion engine in accordance with the operating condition of the refrigerant compressor of a vehicle compartment air conditioner which is a load unit of the engine.

In the past, a typical vehicle compartment air conditioner has included a refrigerant compressor adapted to be coupled and uncoupled through a magnetic clutch thereby controlling the cooling of air in an on-off manner. This on-off type air cooling is disadvantageous in that the supply air temperature varies considerably and the load on the engine varies greatly. A variable capacity type compressor has the advantage of adjusting the refrigerant delivery capacity per unit time continuously or in a stepwise manner and thereby ensuring the required cooling effect and also reducing the variations of the power load.

The control system of the variable capacity type compressor varies the delivery capacity in accordance with the heat load conditions including the temperatures inside and outside the vehicle compartment and the amount of solar radiation and/or the cooling condition of the cooling heat exchanger (the evaporator) and therefore the load on the engine forming a driving source frequently varies from moment to moment irrespective of the operating conditions of the engine. In this case, to cause the idle speed of the engine to faithfully follow the magnitude of the load is important from the standpoint of preventing such irregularity as speed variation in the engine and also from the standpoint of reducing the fuel consumption to the minimum required value.

SUMMARY OF THE INVENTION

It is the primary object of the invention to provide a control apparatus which is combined with such variable capacity type compressor control system to control the fuel consumption of an engine at the minimum value without causing any engine irregularity.

In accordance with the invention there is thus provided a control apparatus including an electric control block which electrically connects first adjusting means for adjusting the idle speed of an engine and second adjusting means for adjusting the refrigerant delivery capacity per operating stroke of a compressor whereby the idle speed of the engine is increased or decreased in synchronism with an increase or decrease in the capacity of the compressor thereby automatically adjusting the compressor load properly in accordance with the idle speed.

Thus, when the required cooling capacity is small, the idle speed is reduced thereby ensuring the cooling capacity required under the idling condition and preventing any excessive cooling.

DESCRIPTION OF THE PREFERRED EMBODIMENT

Figure 1:
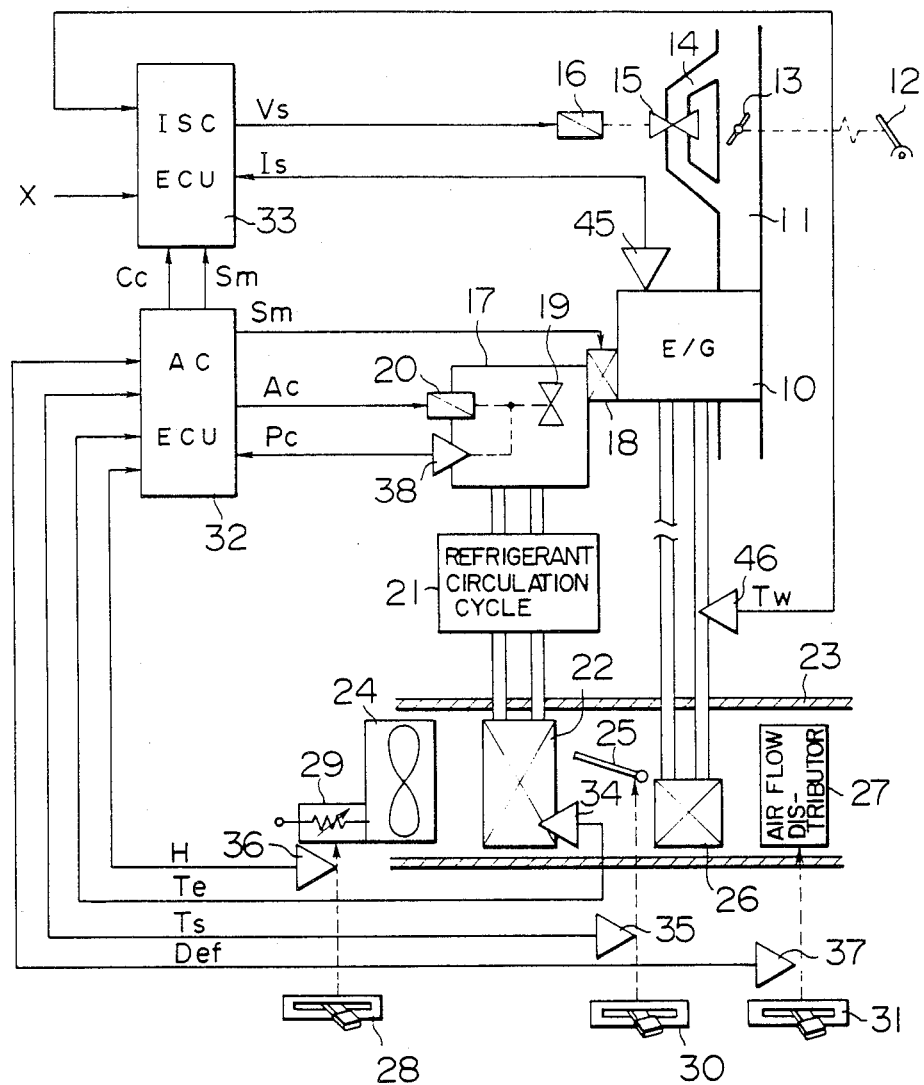
FIG. 1 is a schematic diagram, partially in block form, showing the overall construction of an embodiment of the invention.

The present invention will now be described with reference to the illustrated embodiment. FIG. 1 shows an idle speed control apparatus embodying the invention and an air conditioner control system. In the Figure numeral 10 designates an internal combustion engine as a vehicle driving prime mover and mounted in its intake pipe, 11 is a throttle valve 13 which is mechanically operated by an accelerator pedal 12, thus making it possible to adjust the output of the engine through the operation of the pedal by the driver.

Numeral 14 designates a bypass passage for bypassing the upstream and downstream sides of the throttle valve 13, and a known flow regulating valve 15 (first adjusting means) of the electrically controlled type is positioned in the bypass passage 14. The flow regulating valve 15 is operated by an electromagnetic actuator 16 including for example a linear solenoid or stepping motor so as to vary its passage opening, so that with the throttle valve 13 in the closed position the amount of air corresponding to the passage opening is supplied to the engine and the engine is operated at an idling speed.

Numeral 17 designates a compressor of the variable delivery type which intermittently receives its driving force from the engine 10 through a coupling mechanism 18 including a magnetic clutch and a V-belt. The compressor 17 includes a delivery adjusting member 19 (second adjusting means). The compressor 17 is of the known vane type and the delivery adjusting member 19 includes a bypassing elongated hole at a predetermined position in the compression stroke of the vanes within the cylinder and a movable member for adjusting the effective length of the elongated hole. The amount of movement of the movable member is varied continuously by an electromagnetic actuator 20 and the length of the effective compression stroke of the compressor 17 is varied correspondingly. Thus, the refrigerant delivery capacity per unit time of the compressor 17 can be varied even if the speed of the engine is constant.

The compressor 17 functions as a prime mover for a conventional refrigerant circulation cycle 21 so that the refrigerant is circulated to a refrigerant compression and expansion system passing through an evaporator 22 and a heat absorbing action takes place in the evaporator 22. The magnitude of the heat absorbing action (the degree of cooling) in the evaporator 22 varies in dependence on the amount of the refrigerant delivered by the compressor 17 and generally the heat absorbing action increases with an increase in the amount of refrigerant delivered.

As will be seen from the illustrated typical air conditioner arrangement, the evaporator 22 is positioned downstream of an electric blower 24 within an air conditioner duct 23. In the air conditioner duct 23, a temperature adjusting damper 25 (air mixing damper), a heater core 26 and an air flow distributor 27 are arranged in this order downstream of the evaporator 22. This air conditioner is designed so that the air supplied through the electric blower 24 is cooled by the evaporator 22 and the proportion of the cooled air flow through the heater core 26 is adjusted by the air mixing damper 25 thereby adjusting the temperature. The temperature-adjusted air is distributed by the distributor 27 to a heater air outlet, a ventilation air outlet and a defroster air outlet.

In this embodiment, the air conditioner shown by way of example is designed so that various air conditioning modes excluding the degree of air cooling in the evaporator 22 can be selectively set directly through the manual operation of the occupants. In other words, the blowing capacity of the electric blower 24 is adjustable by varying the resistance value of a current limiting resistor 29 by means of an air supply adjusting lever 28. Also, the amount of temperature adjustment by the air mixing damper 25 is adjustable by a temperature adjusting lever 30 through a link mechanism mechanically coupled therewith. Also, the distribution of the supply air flow through the distributor 27 is adjustable by a supply mode selector lever 31 through a link mechanism mechanically coupled therewith.

Next, an electric control block electrically connected to the above-described idle speed control apparatus and the variable capacity-type compressor will be described.

In FIG. 1, numeral 32 designates a compressor control circuit responsive to the electric signals from input signal devices to determine the amount of adjustment of the delivery adjusting member 19 of the compressor 17 and the coupling or uncoupling condition of the magnetic clutch of the coupling mechanism 18. Numeral 33 designates an idle speed control circuit for determining the opening of the air flow regulating valve 15 in response to the electric signals from input signal devices including particularly the compressor control circuit 32.

Basically, the compressor control circuit 32 determines the capacity of the compressor 17 in such a manner that the air cooling degree of the evaporator 22 suits the position of the air mixing damper 25 or the amount of temperature adjustment desired by the occupants. On the other hand, if an operating mode is selected which particularly requires the removal of moisture from the air, that is, where the air supply capacity is maximum and the supply mode is the defroster supply mode (where the removal of ice or frost or their formation on the window glass is to be effected), a greater capacity is selected.

As a result, the input signal devices include a cooling degree sensor 34 for sensing the actual cooling degree of air and a position sensor 35 for sensing the operated position of the temperature adjusting lever 30. In this embodiment, the cooling degree sensor 34 includes a negative characteristic thermistor positioned immediately downstream of the evaporator 22 and the resistant value of this thermistor increases with decrease in the temperature of the cooled air. The position sensor 35 includes a potentiometer whose resistance value decreases as the air mixing damper 25 is moved toward the cooling position.

The input signal devices further include a maximum air supply switch 36 which is closed when the operated position of the air supply adjusting lever 28 corresponds to the maximum air supply capacity and a defroster switch 37 which is closed when the operated position of the supply mode selector lever 31 corresponds to the defroster supply mode.

In this embodiment, the input signal devices further include a potentiometer 38 for detecting the actual operated position of the electromagnetic actuator 20 since the electromagnetic actuator 20 is of the simple type.

Figure 2:
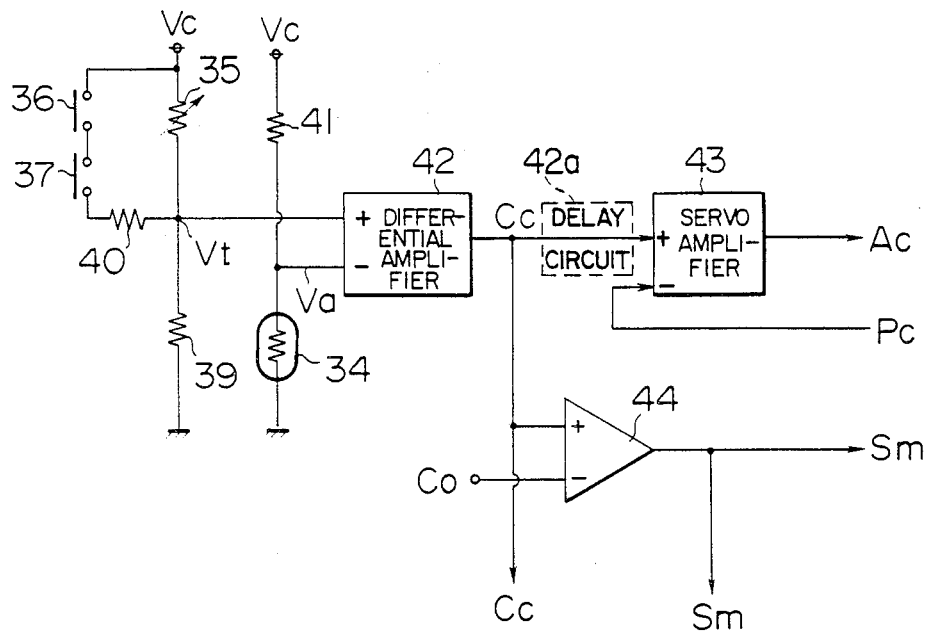
FIG. 2 is a wiring diagram showing in detail the compressor control circuit shown in FIG. 1.

FIG. 2 shows in detail the compressor control circuit 32 and the functions of the cooling degree sensor 34, the position sensor 35, the maximum air supply switch 36 and the defroster switch 37 are as mentioned previously. In this control circuit 32, the position sensor 35 is connected in series with a fixed resistor 39 under a constant voltage $V_c$ and produced at this junction point is a voltage $V_t$ corresponding to the desired cooling degree. The resistance values of the position sensor 35 and the fixed resistor 39 are selected in such a manner that the desired cooling degree voltage $V_t$ attains the minimum value when the air mixing damper 25 is at its maximum cooling position and it attains the maximum value when the air mixing damper 25 is at its maximum heating position. Also, the desired cooling degree indicates near zero degree when the resistance value is minimum and it indicates near 15 degrees when the resistance value is maximum.

The maximum air supply sensing switch 36 and the defroster switch 37 are connected in series with a fixed resistor 40 and they are also connected in parallel with the position sensor 35. The resistance value of the fixed value 40 has a function such that when the switches 36 and 37 are both closed, the desired cooling degree voltage $V_t$ is increased further and thus the desired cooling degree is made lower than the usual value by several degrees.

The cooling degree sensor 34 is connected in series with a fixed resistor 41 under the constant voltage $V_c$ and generated at this junction point is a voltage $V_a$ corresponding to the actual cooling degree. The resistance values of the cooling degree sensor 34 and the fixed resistor 41 are selected so as to match for the desired cooling degree by the position sensor 35 and the fixed resistor 39.

Numeral 42 designates a differential amplifier circuit for receiving the desired cooling degree voltage $V_t$ and the actual cooling degree voltage $V_a$ and generating a control voltage $C_c$ corresponding to the difference between the inputs or the required cooling effect. The control voltage $C_c$ is applied to the following servo amplifier circuit 43 and a switching amplifier circuit 44.

The servo amplifier circuit 43 receives the control voltage $C_c$ and the position signal voltage $P_c$ from the potentiometer 38 and it generates a control output $A_c$ corresponding to the difference between the input voltages. The control output $A_c$ is applied to the electromagnetic actuator 20 so that the position of the delivery adjusting member 19 is adjusted in accordance with the feedback control so as to provide the required cooling effect.

The switching amplifier circuit 44 compares the control voltage $C_c$ with a predetermined constant voltage $C_o$ and generates a coupling output signal $S_m$ which is deenergized when $C_c < C_o$ or when the control voltage $C_c$ is lower than a predetermined reference value set to a point requiring no cooling effect and which is energized when the reverse is the case. The coupling output signal $S_m$ is applied to the magnetic clutch included in the coupling mechanism 18 so that the coupling mechanism 18 is coupled when the required cooling effect is greater than the predetermined value.

In this way, the compressor control circuit 32 generates the control voltage $C_c$ to correspond to the amount of temperature adjustment desired by the occupants or so as to select a greater capacity when an operating mode particularly requiring the dehumidification is selected and moreover the circuit 32 generates the coupling output signal $S_m$ which disengages the coupling mechanism 18 when the control voltage $C_c$ is lower than the predetermined reference value.

The idle speed control circuit 33 is responsive to the operating condition and load condition of the engine 10 so as to determine the desired idle speed, compare it with the actual engine speed, generate a control voltage for controlling the opening of the flow regulating valve 15 in accordance with the resulting difference and apply the control voltage to the electromagnetic actuator 16. As a result, there are provided, as input signal devices, an engine speed sensor 45 for sensing the actual speed of the engine 10 and a temperature sensor 46 for sensing the warming-up condition of the engine 10. Also, the circuit 33 is supplied with the control voltage $C_c$ and the coupling output signal $S_m$ to detect the load condition of the compressor 17 with respect to the engine 10. In addition, another load sensor X may be provided in case of need.

The engine speed sensor 45 is of the type which generates a pulse signal in synchronism with the rotation of the engine 10 and the temperature sensor 46 includes a negative characteristic thermistor positioned in the cooling water pipe leading to the heater core 26 from the engine 10.

Figure 3:
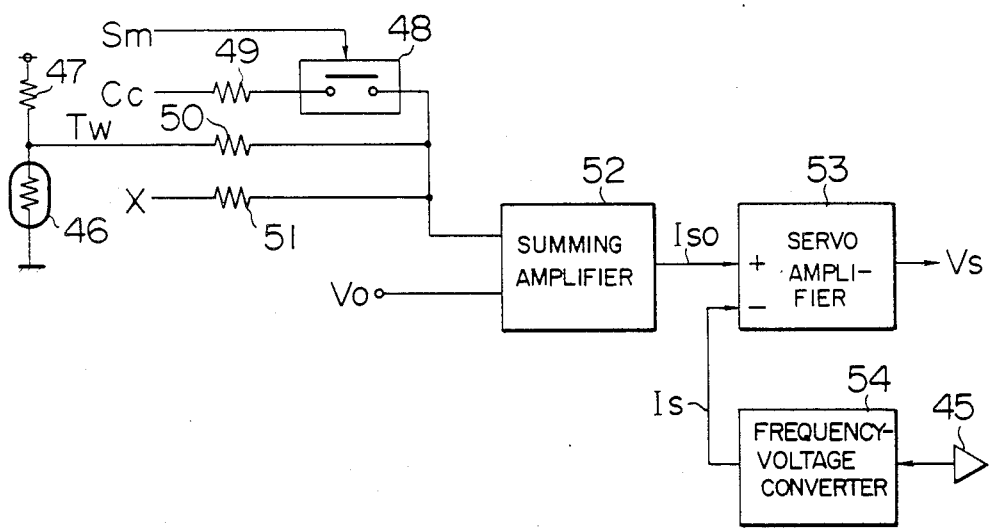
FIG. 3 is a wiring diagram showing in detail the idle speed control circuit shown in FIG. 1.

In FIG. 3 showing the idle speed control circuit 33 in detail, the temperature sensor 46 is connected in series with a fixed resistor 47 so as to generate at the junction point a voltage $T_w$ corresponding to the temperature of the engine 10. The temperature voltage $T_w$ has a value which increases with decrease in the temperature of the engine 10.

Numeral 48 designates a relay switch which is closed when the coupling output signal $S_m$ from the compressor control circuit 32 is at the energized level. Numerals 49, 50 and 51 designate fixed resistors each adapted to serve the function of weighting the voltage applied to its input end and their other ends are combined and connected to a summing amplifier circuit 52. The summing amplifier circuit 52 generates a control voltage $I_{so}$ indicative of the desired idle speed in accordance with the input signals $S_m$, $C_c$, $T_w$ and X. In this case, the weighting of the input signals can be adjusted suitably by the previously mentioned fixed resistors. Note that when the coupling output signal $S_m$ from the compressor control circuit 32 is at the deenergized level, the control voltage $C_c$ indicative of the compressor capacity is not used in the summing operation. Also, the summing amplifier circuit 52 is of the known construction including an OP amplifier and a resistor group and the level of the output control voltage $I_{so}$ is adjustable in accordance with a reference voltage $V_o$.

The control voltage $I_{so}$ generated from the summing amplifier circuit 52 and indicative of the desired idle speed is applied to a servo amplifier circuit 53. On the other hand, the pulse signal generated from the engine speed sensor 45 in synchronism with the engine rotation is converted by a frequency-voltage converter circuit 54 to a signal voltage $I_s$ corresponding to the actual speed of the engine and the signal is applied to the servo amplifier circuit 53. The servo amplifier circuit 53 receives the control voltage $I_{so}$ and the signal voltage $I_s$ and generates a control voltage $V_s$ corresponding to the difference between the two voltages. The control voltage $V_s$ is applied to the electromagnetic actuator 16 so that the passage opening of the flow regulating valve 15 is adjusted in accordance with the feedback control so as to maintain the actual idle speed at the desired idle speed.

In this control apparatus, the idle speed control circuit 33 is operated with power supplied in response to the closing of the automobile key switch which is not shown and the compressor control circuit 32 is operated with power supplied in response to the air conditioner switch which is not shown. In the operated condition, the compressor control circuit 32 controls the compressor 17 by determining its capacity in accordance with the conditions of the air conditioner actuators operated by the occupants. On the other hand, the idle speed control circuit 33 determines and controls the desired idle speed in accordance with the operating conditions of the engine 10 and the control signal $C_c$ from the compressor control circuit 32 which is indicative of the desired value of the compressor capacity. In this case, the idle speed control circuit 33 receives the control signal $S_m$ prior to the actual change of the compressor capacity and therefore the idle speed of the engine 10 is adjusted in synchronism with the change of the compressor capacity. This in turn prevents the occurrence of any irregularity in the speed of the engine 10 due to a change in the compressor capacity.

While the invention has been described with reference to a preferred embodiment, the invention is not intended to be limited thereto and it is possible to make not only various changes in the details of the mechanical and electrical constructions shown in FIGS. 1 to 3 but also other changes summarized as follows.

(1) While the compressor control circuit can control the compressor capacity in accordance with the temperature to be adjusted, in this case not only the circuit is operatively associated with the temperature adjusting lever as in the case of the above-described embodiment, but also the circuit may be designed so as to control the compressor capacity in accordance with the signal from a vehicle compartment temperature measuring device and, if necessary, disturbance information such as measurement signals of the compartment outside temperature, solar radiation intensity, etc., in the case for example of an air conditioner of the type in which the position of a temperature adjusting member (air mixing damper) is automatically controlled in accordance with the signal from the vehicle compartment temperature measuring device. Further, the compressor control circuit may be made responsive to the signals from the devices for measuring the vehicle compartment temperature, the frosted condition of the window glass, etc., and in this way the compressor control factors of the compressor are changed in accordance with the environmental conditions of the vehicle compartment. Further, to provide the compressor control circuit with a function for reducing the compressor capacity when the engine speed exceeds a necessary and sufficient speed for the compressor does not constitute any departure from the spirit and scope of the invention.

(2) The compressor control circuit may be so designed that after the compressor capacity has been determined, a control signal is applied to the delivery adjusting member when the idle speed attains the desired value corresponding to the compressor capacity. Thus, in the circuit construction of FIG. 2, for example, a delay circuit 42a such as an RC integrator circuit may be connected between the differential amplifier circuit 42 and the servo amplifier circuit 43.

(3) Either one or both of the control functions of the above-described compressor control circuit and idle speed control circuit may be accomplished by means of a microcomputer.

From the foregoing description it will be seen that the present invention has the effect of further enhancing the advantages of the compressor capacity control.

I claim:

1. An idle speed control apparatus for an automotive vehicle internal combustion engine adapted to drive a refrigerant compressor of a vehicle compartment air conditioner comprising:

first adjusting means for adjusting an idle speed of said engine;

second adjusting means for adjusting a refrigerant delivery capacity per operating stroke of said compressor; and an electric control block for electrically controlling said second adjusting means and electrically controlling said first adjusting means in cooperation with said first-mentioned control operation, said electric control block comprising:

first detecting means for detecting an operating condition of said engine;

second detecting means for detecting a condition for a first load comprising said compressor;

third detecting means for detecting a condition of a second load other than said compressor;

means for generating an idle control signal when total engine load represented by outputs from said first, second and third detecting means exceeds a predetermined load threshold;

means responsive to said compressor adjusted to a desired refrigerant delivery condition and said second detecting means to generate a desired cooling control signal;

means responsive to said cooling signal exceeding a predetermined value to generate a compressor drive signal; and means responsive to said drive signal to control the application of said cooling control voltage to said idle control signal generating means.

2. An idle speed control apparatus for an automotive vehicle internal combustion engine adapted to drive a refrigerant compressor of a vehicle compartment air conditioner, said apparatus comprising:

first adjusting means for adjusting an idle speed of said engine;

second adjusting means for adjusting a refrigerant delivery capacity per one operating stroke of said compressor;

and electrical control means for electrically controlling said first adjusting means in an interlocked relation with adjustment of said second adjusting means, wherein said control means comprises:

means for selectively producing a first temperature signal indicative of a desired compartment temperature;

means for detecting an actual compartment temperature and generating a second temperature signal indicative of the detected temperature;

means for comparing said first and second temperature signals and generating a refrigerant-delivery-capacity control signal to control said second adjusting means;

means for comparing said control signal with a first predetermined threshold to generate a compressor drive control signal to enable or disable said compressor;

first detecting means for detecting an operating condition of said engine and generating an engine-condition indicating signal;

second detecting means for detecting an engine-load condition and generating a load-condition indicating signal;

means for producing a sum signal of the refrigerant-delivery-capacity control signal, engine-condition indicating signal and load-condition indicating signal and comparing the produced sum signal with a second predetermined threshold to generate an idle speed control signal to control said first adjusting means; and means for controlling application of said refrigerant-delivery-capacity control signal to said sum-signal producing and comparing means in response to said compressor drive control signal.

3. An apparatus as claimed in claim 1, further comprising a time delay circuit for receiving said refrigerant-delivery-capacity control signal from said comparing means and delaying the application of said refrigerant-delivery-capacity control signal to said second adjusting means, in order to allow the idle speed to attain the desired value corresponding to the compressor capacity.

* * * * *